United States Patent [19]

Carraher

[11] Patent Number: 5,193,737
[45] Date of Patent: Mar. 16, 1993

[54] METHOD AND APPARATUS FOR DIFFUSION BONDING

[75] Inventor: John W. Carraher, Sardinia, Ohio

[73] Assignee: General Electric Company, Cincinnati, Ohio

[21] Appl. No.: 420,450

[22] Filed: Oct. 12, 1989

[51] Int. Cl.[5] .................. B21D 39/00; B21K 28/00
[52] U.S. Cl. .................... 228/157; 228/44.3; 228/193
[58] Field of Search ............ 228/263.21, 243, 221, 228/193, 184, 181, 157, 44.3

[56] References Cited

U.S. PATENT DOCUMENTS

| | | | |
|---|---|---|---|
| 3,538,593 | 11/1970 | King, Jr. et al. | 228/173.2 |
| 3,633,267 | 1/1972 | Deminet et al. | 228/106 |
| 4,013,210 | 3/1977 | Deminet | 228/106 |
| 4,043,498 | 8/1977 | Conn, Jr. | 228/265 |
| 4,087,037 | 5/1978 | Shier et al. | 228/157 |
| 4,089,456 | 5/1978 | Toppen et al. | 228/44.3 |
| 4,117,970 | 10/1978 | Hamilton et al. | 228/181 |
| 4,197,977 | 4/1980 | Deminet | 228/106 |
| 4,304,350 | 12/1981 | Paez et al. | 228/44.3 |
| 4,304,821 | 12/1981 | Hayase et al. | 228/157 |

FOREIGN PATENT DOCUMENTS 0358523 3/1990 United Kingdom .

*Primary Examiner*—David H. Brown
*Attorney, Agent, or Firm*—Jerome C. Squillaro; Carmen Santa Maria

[57] ABSTRACT

A method and apparatus of diffusion bonding structural components to a titanium honeycomb panel comprises inserting the honeycomb panel within a cavity formed in a pair of tool halves such that one face sheet of the honeycomb panel is positioned in contact with or immediately adjacent the bonding surface of one or more structural components carried by the tool halves. Heat and vacuum are applied at the interface between the structural components and honeycomb panel, and then a pressurized gas is pumped into the interior of the honeycomb panel to urge its face sheet outwardly into engagement with the bonding surfaces of the structural components with sufficient force to effect a diffusion bond therebetween.

12 Claims, 2 Drawing Sheets

METHOD AND APPARATUS FOR DIFFUSION BONDING

The government has rights in this invention pursuant to Contract No. F33657-83-C-0281 awarded by the Department of Air Force.

FIELD OF THE INVENTION

This invention relates to a method and apparatus for diffusion bonding, and, more particularly, to a method and apparatus for attaching structural components to at least one face sheet of a titanium honeycomb panel using diffusion bonding.

BACKGROUND OF THE INVENTION

Advances have been made in recent years in the design of structural components for the aerospace industry, but the provision of lightweight, reliable joint connections between such structural components continues to present problems. One type of joint connection which has been used in the past is fasteners in the form of bolts, rivets, screws and the like. One problem with fasteners is that they require holes to be formed in the structural components to be joined. As a result, the adjoining portions of the structural components must be made somewhat larger to make up for the reduction of load carrying capability lost by the formation of holes therein. Such holes also tend to create stress concentrations in the structure adjacent the holes which can result in the formation of a fatigue crack thereat. Additionally, the presence of fasteners between adjoining structural components adds weight to the joint which is undesirable in any aerospace application.

In view of the problems with fasteners, efforts had been made to join abutting structural components by creating a bond therebetween such as by adhesive bonding, brazing, welding and diffusion bonding. While some of these techniques solve many of the problems associated with the use of fasteners, other problems are created, particularly in applications such as the construction of jet aircraft which operate at relatively high, sustained temperatures.

For example, most organic adhesives cannot be used to bond components subjected to the types of operating temperatures in the turbo-machinery of jet aircraft. Braze metals have been proposed as an alternative to organic adhesives, but such metals are also affected by heat. If a braze metal connecting two structural components is maintained at a melting temperature for too long, it may tend to flow away from the brazed area causing failure of the joint. At least some braze metals tend to dissolve into the metal of the adjoining structural components to be connected, and form an embrittled alloy having reduced strength.

One alternative to adhesive bonding, welding or brazing is diffusion bonding, which has been used effectively in the attachment of some titanium components. Although not precisely understood, it is believed that the process of diffusion bonding operates by bringing the surfaces of two components into contact with one another at sufficient heat and pressure so that the atoms adjacent the adjoining surfaces move together to-form atomically or molecularly mating surfaces which hold the components together as a unitary structure. As disclosed, for example, in U.S. Pat. No. 3,633,267, "honeycomb" structures or panels have been successfully formed using diffusion bonding techniques. These honeycomb panels comprise a titanium honeycomb or cellular core which is diffusion bonded to opposed titanium face sheets, and, in some configurations, to opposed side sections. Such panels have been used extensively in the aerospace industry because of their favorable strength to weight ratio.

While diffusion bonding has been successfully employed to form the honeycomb panels themselves, a more difficult problem is presented in bonding structural components to a honeycomb panel. As described above, the process of diffusion bonding requires the application of sufficient pressure and heat to the surfaces to be bonded to cause the atoms or molecules of the adjoining surfaces to move together. It has been found that the application of a relatively large compressive force on a honeycomb panel can cause damage to its cellular core. As a result, honeycomb panels have been bonded to one another using additional face sheets, plates and/or fasteners. The use of fasteners creates a number of problems as discussed above, and additional face sheets or plates increases the weight of such components.

Improved methods of diffusion bonding have been proposed which protect the cellular core of honeycomb panels while obtaining the desired diffusion bond between the surface of a honeycomb panel and an abutting structural component. U.S. Pat. No. 4,013,210, for example, discloses a method of diffusion bonding honeycomb panels to other structural components in which a substantial vacuum is applied at the surfaces wherein the diffusion bonding takes place. Under this vacuum, the surfaces are heated and brought into contact with one another with only moderate pressure being required to effect the diffusion bond.

In order to apply the required compressive force to the honeycomb panel and/or structural components to be bonded, the method disclosed in the U.S. Pat. No. 4,013,210 employs a glass pad positioned against a face sheet of the honeycomb panel which, when melted under diffusion bonding temperatures, is sufficiently compliant to evenly transfer compressive force over the entire face sheet. This compressive force is applied to the glass pad by a weight which is initially spaced from the glass pad by glass spacer blocks. At diffusion bonding temperatures, these glass spacer blocks melt and permit the weight to move against the glass pad which applies a compressive force therethrough to the face sheet of the honeycomb panel. In turn, the honeycomb panel is urged against a structural component to be bonded thereto with moderate pressure which protects the core of the honeycomb panel from damage.

One problem with the diffusion bonding method disclosed in U.S. Pat. No. 4,013,210 is that the application of a compressive force through the glass pad is dependent upon the movement of a weight thereagainst. The weight is supported on at least two glass blocks which must melt at the same rate to permit the weight to uniformly move against the glass pad on the surface of the honeycomb panel. This movement of the weight is substantially uncontrolled once the diffusion bonding process begins, and it is contemplated that the weight could become misaligned or tipped with respect to the glass compliant pad and honeycomb panel which would result in the application of an uneven compressive force across the honeycomb panel.

SUMMARY OF THE INVENTION

It is therefore among the objectives of this invention to provide a method and apparatus for diffusion bonding a honeycomb panel to one or more structural components in which an even, uniform compressive force is applied at the bonding surfaces of the honeycomb panel and other structural components in order to effect a diffusion bond therebetween.

These objectives are accomplished in a method and apparatus for diffusion bonding in which a honeycomb panel having a cellular core, opposed face sheets and side panels is positioned within a cavity formed in a pair of tool halves. Structural components to be bonded to the honeycomb panel are carried by one or both of the tool halves such that when the tool halves are closed around the honeycomb panel, a bonding surface of each structural component is located immediately adjacent one of the face sheets of the honeycomb panel. The entire assembly is placed in a vacuum furnace or other enclosure which is effective to apply a vacuum across the interface between the face sheet of the honeycomb panel and bonding surfaces of the structural components to be bonded, and to heat the entire assembly to diffusion bonding temperatures. In order to apply a uniform compressive force between the face sheet of the honeycomb panel and bonding surfaces of the structural components, a gas is pumped into the interior of the honeycomb panel which urges its face sheet outwardly against the bonding surfaces of the structural components with sufficient pressure to effect a diffusion bond therebetween.

This invention is therefore predicated upon the concept of diffusion bonding using a compressive force which is developed internally of the honeycomb panel to be bonded. Under the application of vacuum and diffusion bonding temperatures, the interior of the honeycomb panel is pressurized to urge one of its face sheets outwardly and into engagement with adjacent structural components. The relative movement between the face sheet of the honeycomb panel and the structural components is slight because only a relatively moderate force is required to effect diffusion bonding therebetween in the presence of vacuum. The face sheet is relatively thin and has sufficient flexibility to expand slightly under pressure.

Several advantages are obtained with the method and apparatus of this invention. Because no weight or other structure is moved into contact with a face sheet of the honeycomb panel, such face sheet can be relatively thin compared to honeycomb panels in the prior art and this provides an overall weight savings in the panel. Internal pressurization of the honeycomb panel by a pressurized gas results in the uniform, repeatable application of compressive force between the face sheet of the panel and an adjacent structural component which ensures that an appropriate diffusion bond is obtained therebetween. Only slight movement of the face sheet is required to apply the compressive force, and such force is applied independently of the temperature or vacuum levels in the vacuum furnace.

Another advantage of the method and apparatus herein is that the structural components are accurately held in position within one or both of the two tool halves relative to a face sheet of the honeycomb panel. As a result, the dimensional accuracy with which the structural components are bonded to the panel is improved compared to prior methods.

In the presently preferred embodiment, a titanium honeycomb panel is fabricated comprising a honeycomb or cellular core attached to opposed face sheets and having side panels extending between the face sheets to form an enclosed panel. A pipe or tube is attached to one of the side plates of the honeycomb panel to provide a path for the delivery of pressurized air into its interior. A pair of mating tool halves are constructed with a first cavity adapted to receive the honeycomb panel and a number of second cavities which receive the structural components to be bonded to the honeycomb panel. These second cavities are formed to receive the structural components and position them with respect to the honeycomb panel, when the tool halves are closed, such that a smooth flat bonding surface of each structural component contacts or is positioned immediately adjacent at least one of the face sheets of the honeycomb panel. Preferably, the tool halves are formed with an internal passageway having an outlet end adapted to connect to the tube of the honeycomb panel and an inlet end at an outer surface of the tool halves.

In preparation for a diffusion bonding operation, all titanium surfaces of the honeycomb panel are chemically cleaned and a solvent is employed to clean the surfaces of the tool halves and structural components to be bonded to the honeycomb panel. The structural components and honeycomb panel are loaded in the tool halves which are then interconnected by bolts or other fasteners. This assembly is placed into a specially constructed vacuum enclosure, such as a vacuum furnace, and a pipe is connected to the inlet end of the passageway in the tool to supply air to the interior of the honeycomb panel as discussed below.

The vacuum enclosure is operative to apply a vacuum of about $10^{-5}$ torr at the interface between the face sheet of the honeycomb panel and bonding surfaces of the structural components to be bonded. The enclosure also applies heat at such interface, preferably in the range of about 1,650° to 1,675° F. Once the appropriate vacuum and temperature has been achieved at the interface between the honeycomb panel and structural components, dry argon gas is pumped into the interior of the honeycomb panel at a pressure of preferably about 300 pounds per square inch for a period of about two hours. Pressurization of the interior of the honeycomb panel forces its outer face sheet against the abutting bonding surfaces of the structural components to effect a diffusion bond therebetween. After the two hour bonding period, the enclosure is cooled to about 300° F. keeping the tool halves and structural components at no more than about a 50° temperature differential. The pressure within the vacuum enclosure is raised to about one atmosphere, at which time the assembly is removed therefrom. The tool halves are then pulled apart and the honeycomb panel and structural component unit is removed and inspected.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
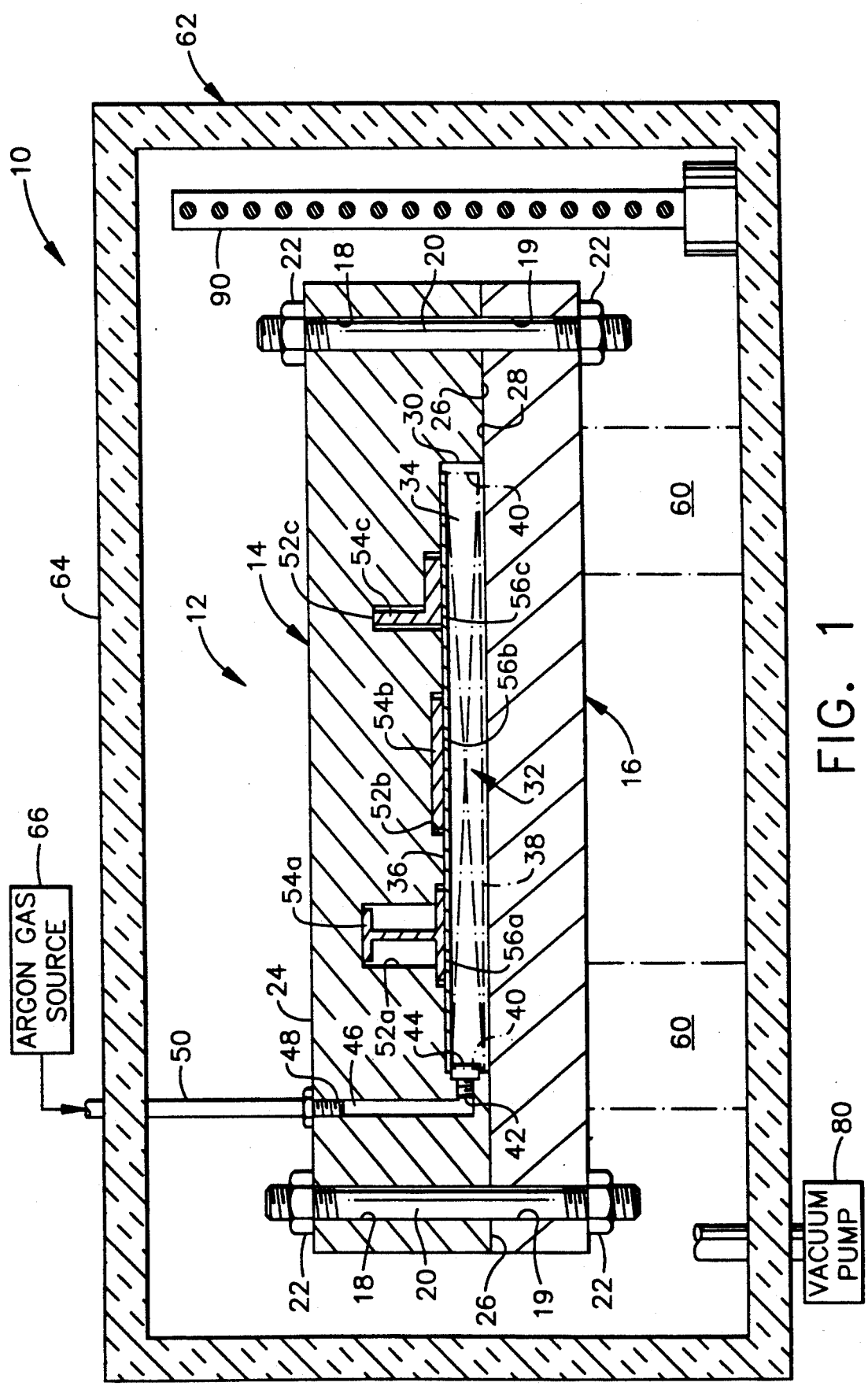
FIG. 1 is a schematic view in partial cross section of the mating tool halves with the honeycomb panel and structure components positioned therein, and the entire assembly placed in a vacuum enclosure.

Referring to FIG. 1, the diffusion bonding apparatus 10 of this invention comprises a tool assembly 12 consisting of an upper tool half 14 and a lower tool half 16. The tool halves 14, 16 are formed with a number of aligning bores 18, 19, respectively, each of which receive a tie bolt 20 extending therebetween The tie bolts 20 are secured by nuts 22 to interconnect the upper and lower tool halves 14, 16.

The upper tool half 14 has an upper surface 24, and a lower surface 26 which mates with the upper surface 28 of lower tool half 16. A first cavity 30 is formed in the upper tool half 14 which extends upwardly from its lower surface 26 toward its upper surface 24. This first cavity 30 is formed to receive a honeycomb panel 32 which is shown schematically in FIG. 1. The honeycomb panel 32 forms no part of this invention per se and can be made in accordance with the teachings of U.S. Pat. Nos. 3,633,267 and 4,013,210. As disclosed in these patents, the honey-comb panel 32 has an inner honeycomb or cellular core 34 diffusion bonded to an upper face sheet 36, a lower face sheet 38, and side sections 40. In the presently preferred embodiment, a stub tube 42 is connected at an opening 44 in one of the side sections 40, and this tube 42 extends into the inlet of a passageway 46 formed in the upper tool half 14. The passageway 46 has a threaded opening 48 at the upper surface 24 of upper tool half 14. An air supply pipe 50 is mounted to the upper tool half 14 at this opening 48 for purposes to become apparent below.

The upper tool half 14 is also formed with three part-receiving cavities 52a, b and c which mount structural components 54a, b and c, respectively. With the upper and lower tool halves 14, 16 in an assembled position as shown in FIG. 1, the part-receiving cavities 52a-c position the structural components 54a-c in engagement with or immediately adjacent to the upper face sheet 36 of the honeycomb panel 32 located within the first cavity 30. Each of the structural components 54a-c has a smooth, bonding surface 56a-c, respectively, and the part-receiving cavities 52a-c are configured such that these bonding surfaces 56a-c are substantially flush with the top surface of the first cavity 30.

As illustrated in FIG. 1, the assembly consisting of the tool halves 14, 16, honeycomb panel 32 and structural components 54a-c are adapted to be positioned atop supports 60 within a vacuum enclosure 62 such as a vacuum furnace or a specially constructed heat forming press. In this position, the supply pipe 50 connected to the upper tool half 14 extends through the top wall 64 of the vacuum enclosure 62 and is connected to a source 66 of pressurized gas such as dry argon gas or a suitable alternative. This gas source 66, illustrated schematically in FIG. 1, is operative to direct pressurized gas through the supply pipe 50, into the passageway 46 formed in upper tool half 14 and then through the tube 42 into the interior of the honeycomb panel 32.

Figure 2:
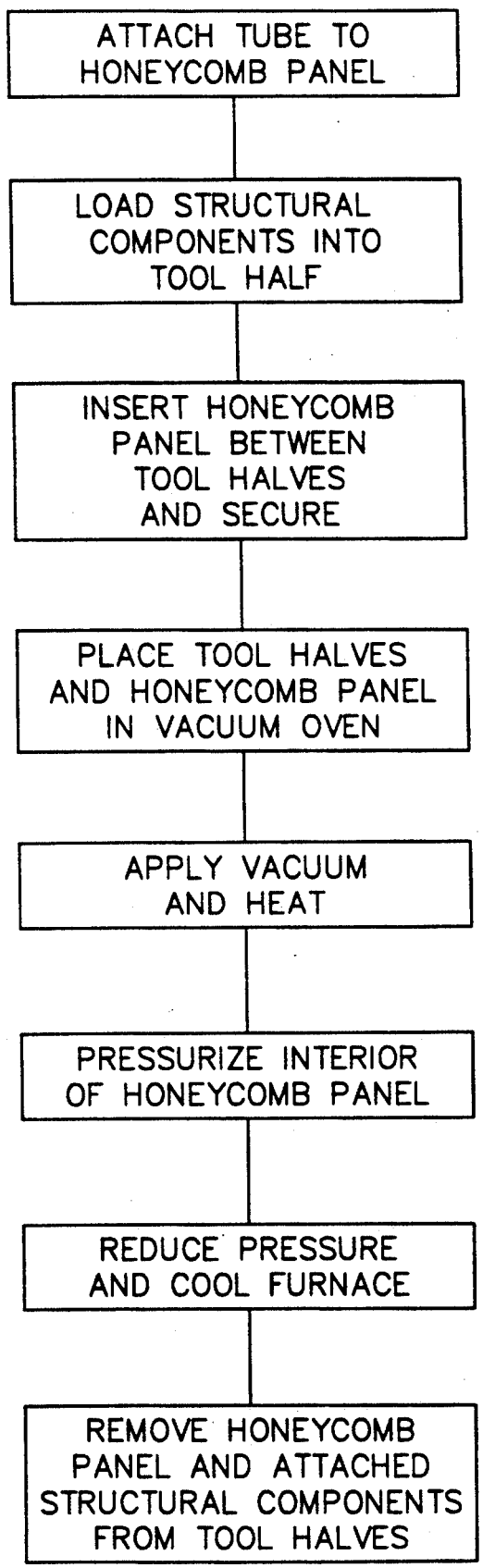
FIG. 2 is a flow chart of the steps of the method of diffusion bonding of this invention.

With reference to FIGS. 1 and 2, the method of diffusion bonding of this invention proceeds as follows. Employing a honeycomb panel 32 of the type manufactured in accordance with the teachings of U.S. Pat. Nos. 3,633,267, 4,013,210 or any other suitable method, the tube 42 is initially welded to one of the side sections 40 at an opening 44 therein. In the event the honeycomb panel 32 is supplied without side sections 40, these side sections can be welded thereto to form a substantially enclosed honeycomb panel 32 before the tube 42 is welded in place.

All of the areas of the titanium honeycomb panel 32 are chemically cleaned to remove the surface coating of titanium oxide and any other impurities which may be present thereon. These impurities could dissolve into the titanium during the diffusion bonding process and create unacceptable embrittlement which would reduce the strength of the resulting structure. Similarly, a solvent is employed to wipe all surfaces of the upper and lower tool halves 14, 16 as well as the structural components 54a-c to be bonded to the honeycomb panel 32.

The next step in the process is to load all of the structural components 54a-c into the corresponding part-receiving cavities 52a-c, and to place the honeycomb panel 32 within the first cavity 30 such that its tube 42 extends into the passageway 46 formed in the upper tool half 14. An O-ring seal (not shown) is provided at such connection to avoid any leakage between the tube 42 and passageway 46. The upper and lower tool halves 14, 16 are then secured together by the tie bolts 20 and nuts 22 as shown in FIG. 1. This entire assembly is then inserted into the vacuum enclosure 62 atop the supports 60, and the supply pipe 50 is affixed to the opening 48 in the upper tool half 14. Appropriate pressure lines are connected between the supply pipe 50 and the argon gas source 66 and thermocouples (not shown) are connected to the upper tool halves 14, 16 to monitor the temperature therein.

The vacuum enclosure 62 is then operated to apply by a vacuum means 80 a vacuum of about $10^{-5}$ torr at the interface between the bonding surfaces 56a-c of the structural components 54a-c and the upper face 36 of the honey-comb panel 32. The vacuum enclosure 62 by a heating means 90° also heats such interface to a temperature preferably in the range of about 1,650° to 1,675° F. It has been found that these vacuum and temperature levels are required to affect an appropriate diffusion bond between the honeycomb panel 32 and the structural components 54a-c.

The source 66 of argon gas is then effective to pump dry argon gas through pipe 50, passageway 46 and tube 42 into the interior of the honeycomb panel 32. In the presently preferred embodiment, a pressure of about 300 pounds per square inch is maintained within the honeycomb panel 32 for a period of about two hours. This gas pressure within the interior of honeycomb panel 32 expands the outer surface of the upper face sheet 36 a sufficient amount to create a compressive force between the upper face sheet 36 and the bonding surface 56a-c of each structural component 54a-c. In the presence of the heat and vacuum conditions at such interface, a relatively moderate compressive force is required to effect diffusion bonding between the upper face sheet 36 and structural components 54a-c.

After the two hour period has elapsed, the pressurized argon gas within the interior of the honeycomb panel 32 is allowed to escape along the same flow path used to fill the honeycomb panel 32. At the same time, the vacuum enclosure 62 is cooled to about 300° F. keeping the tool halves 14, 16 and structural components 54a-c within no more than about a 50° F. temperature differential. Such temperature differential can be monitored by the thermocouples carried in the upper tool half 14. The pressure within the vacuum enclosure 62 is stabilized at one atmosphere and the entire assembly is then removed from the vacuum enclosure 62. The tool halves 14, 16 are disconnected and then the honeycomb panel 32 and structural component 54a-c unit is removed from the tool halves 14, 16 for inspection.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, while three part-receiving cavities 52a-c are illustrated in FIG. 1, it is contemplated that essentially any number and positioning of part-receiving cavities could be employed within the scope of this invention. Additionally, it is contemplated that the first cavity 30 which receives the honeycomb panel 32 could be formed not only in the upper tool half 14 as shown, but also in the lower tool half 16 or partially within both tool halves 14 and 16. Further, any suitable fasteners can be utilized to interconnect the tool halves 14, 16 as desired.

In addition, FIG. 1 illustrates a pair of mating tool halves 14 and 16 which are employed to mount the honeycomb panel 32 and structural components 54a-c. The upper tool half 14 is a carrier for the structural components 54a-c and the lower tool half 16 provides a surface 28 for supporting the honeycomb panel 32 and engaging the upper tool half 14. It is contemplated that a single tool half or similar carrier could be mounted to the planar surface of a support or wall of the vacuum furnace, instead of a second tool half, to provide a cavity for the honey-comb panel and a mating surface for the single tool half.

Therefore, it is intended that the invention not be limited to the particular embodiment disclosed as the best mode contemplated for carrying out this invention, but that the invention will include all embodiments falling within the scope of the appended claims.

I claim:

1. A method of diffusion bonding structural components to a honeycomb panel having an interior defined by spaced, outer face sheets which are connected to an inner core, comprising:
   positioning the honeycomb panel between a first surface and a carrier which supports structural components so that at least one outer face sheet of the honeycomb panel faces the structural components;
   drawing a vacuum at the interface between the honeycomb panel and the structural components supported in the carrier;
   heating the honeycomb panel and structural components;
   pressurizing the interior of the honeycomb panel to force said at least one outer face sheet into contact with the structural components with sufficient force to effect a diffusion bond therebetween.

2. A method of diffusion bonding structural components to a honeycomb panel having an interior defined by spaced, outer face sheets which are connected to an inner core, comprising:
   placing the honeycomb panel between two halves of a tool, at least one of said tool halves carrying the structural components to be bonded to said honeycomb panel;
   closing said two tool halves so that at least one outer face sheet of said honeycomb panel faces a bonding surface of each structural component;
   applying a vacuum and heat to the interface of said tool halves and said honeycomb panel;
   pressurizing the interior of said honeycomb panel to force said outer face sheet thereof against said bonding surface of each structural component with sufficient force to effect a diffusion bond therebetween.

3. The method of claim 2 in which said step of applying a vacuum to the interface of said tool halves and said honeycomb panel comprises applying a vacuum of about $10^{-5}$ torr thereto.

4. The method of claim 2 in which said step of applying heat to the interface of said tool halves and said honeycomb panel comprises applying heat in the range of about 1,650° to 1,675° F. thereto.

5. The method of claim 2 in which said step of pressurizing said interior of said honeycomb panel comprises injecting gas into said interior at a pressure of about 300 pounds per square inch.

6. The method of claim 5 in which said step of injecting gas into said interior of said honeycomb panel comprises injecting dry argon gas therein.

7. The method of claim 6 in which said step of injecting gas into said interior of said honeycomb panel comprises maintaining said dry argon gas at said pressure of about 300 pounds per square inch for a time period of about two hours.

8. Apparatus for diffusion bonding structural components to a honeycomb panel having an interior defined by spaced, outer face sheets which are connected to an inner core comprising:
   a carrier formed with a first cavity for supporting the honeycomb panel, and at least one second cavity for supporting a structural component in a position to face at least one of said outer face sheets of said honeycomb panel;
   means for drawing a vacuum at the interface between said structural component and said outer face sheet of said honeycomb panel;
   means for heating the interface between said structural component and said outer face sheet of said honeycomb panel;
   means for pressurizing said interior of said honeycomb panel to force said outer face sheet thereof against said structural component with sufficient force to effect a diffusion bond therebetween.

9. Apparatus for diffusion bonding structural components to a honeycomb panel having an interior defined by spaced, outer face sheets which are connected to an inner core, comprising:
   first and second mating tool halves formed with a cavity for supporting said honeycomb panel, at least one of said first and second tool halves being formed with means for supporting structural components having bonding surfaces in a position wherein said bonding surface of each structural component faces an outer face sheet of said honeycomb panel;
   means for heating and for drawing a vacuum at the interface between said structural component and said outer face sheet of said honeycomb panel;
   means for pressurizing said interior of said honeycomb panel to force said outer face sheet against said structural component with sufficient force to effect a diffusion bond therebetween.

10. The apparatus of claim 9 in which said first and second tool halves have mating surfaces, said means for supporting structural components comprising a number of cavities formed in one of said first and second tool halves which conform to the shape of said structural components to be bonded to said honeycomb panel, said structural components being supported in said cavities so that said bonding surface of each of said structural components is substantially flush with said mating surface of one of said first and second tool halves.

11. The apparatus of claim 9 in which said means for heating and for drawing a vacuum comprises a vacuum enclosure having a hollow interior adapted to receive said first and second tool halves, said honeycomb panel and said structural components therein.

12. The apparatus of claim 9 in which said means for pressurizing said interior of said honeycomb panel comprises:
- a passageway formed in said first tool half, said passageway having an inlet and an outlet at said first cavity;
- a stub tube extending from said interior of said honeycomb panel into said outlet of said passageway;
- means for pumping pressurized gas;
- a supply pipe connected between said inlet of said passageway and said means for pumping pressurized gas, the pressurized gas being directed through said supply tube, said passageway and said stub tube into said interior of said honeycomb panel.

* * * * *